July 15, 1941.　　　J. M. WOOD　　　2,249,643
VALVE
Filed Aug. 11, 1938　　　2 Sheets-Sheet 1

Inventor:
John M. Wood
By Armington & White
Attorneys.

July 15, 1941.  J. M. WOOD  2,249,643
VALVE
Filed Aug. 11, 1938  2 Sheets-Sheet 2

Inventor:
John M. Wood
By Armington & White
Attorneys.

Patented July 15, 1941

2,249,643

UNITED STATES PATENT OFFICE 2,249,643

VALVE

John M. Wood, Cranston, R. I., assignor to Franklin Process Company, Providence, R. I., a corporation of Rhode Island Application August 11, 1938, Serial No. 224,330

4 Claims. (Cl. 308—161)

The present invention relates to improvements in valves of the type having rotatable plugs or closures for changing the direction of the flow of fluid through the valve.

One of the objects of the present invention is to provide a valve of the type indicated having closure-mechanism removable from the casing as a unit.

Another object of the invention is to provide a valve of the type indicated having thrust collars on the valve-stem adapted to cooperate with bearings on a frame of the removable unit to mount the valve-closure thereon and restrain it against axial movement.

Another object of the invention is to provide thrust collars of the type indicated comprising segments retained in peripheral grooves in the valve-stem and removable to release the valve-closure to facilitate the assembly and disassembly of the closure and frame.

Still another object of the invention is to provide a valve of the type indicated which is of simple and compact construction to adapt it for economical manufacture and one which reduces wear and the necessity for replacement of the movable parts.

Further objects of the invention are set forth in the following specification which describes a preferred form of construction of the valve, by way of example, as illustrated by the accompanying drawings. In the drawings.

Figure 1:
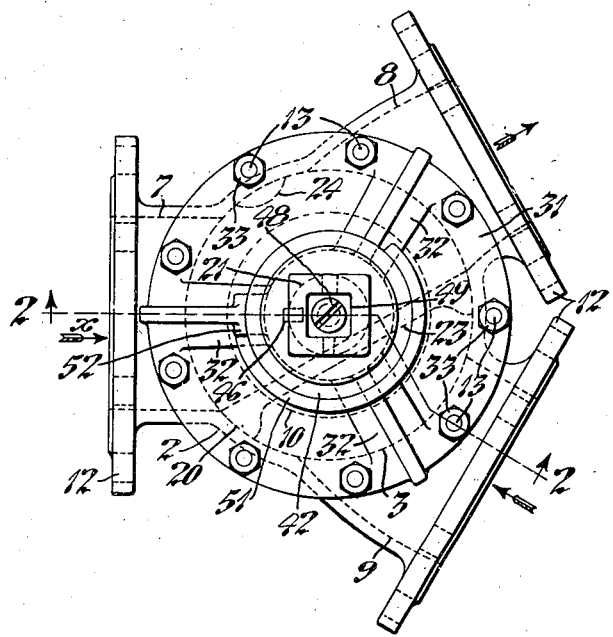
Fig. 1 is a plan view of a four-way valve incorporating the novel features of the present invention.

While the invention is herein illustrated and described as embodied in a four-way valve it is to be understood that the improved features may be applied to other types of valves. In the drawings the reference character 2 designates the Y-shaped casing of a four-way valve. The casing 2 has a central bore 3 extending transversely of its branches to form a chamber therein with upper and lower annular bearings 4 and 5. The bore 3 extends through the top of the casing and surrounding its open end is an annular seat 6 with tapped holes for receiving threaded studs 13 projecting upwardly therefrom for a purpose as will later appear. An inlet port 7 and a pair of alternate inlet and outlet ports 8 and 9 are provided in the branches of the Y-shaped casing communicating with the axial bore 3 radially thereof. An exhaust port 10 is also provided in the bottom wall of the casing 2 disposed axially of the bore 3. The bottom of the casing 2 is adapted to be bolted to an exhaust pipe for the fluid by means of threaded studs 11 and the several branches of the casing are provided with peripheral flanges 12 at their outer ends for connecting them to their respective supply or discharge pipes.

Figure 4:
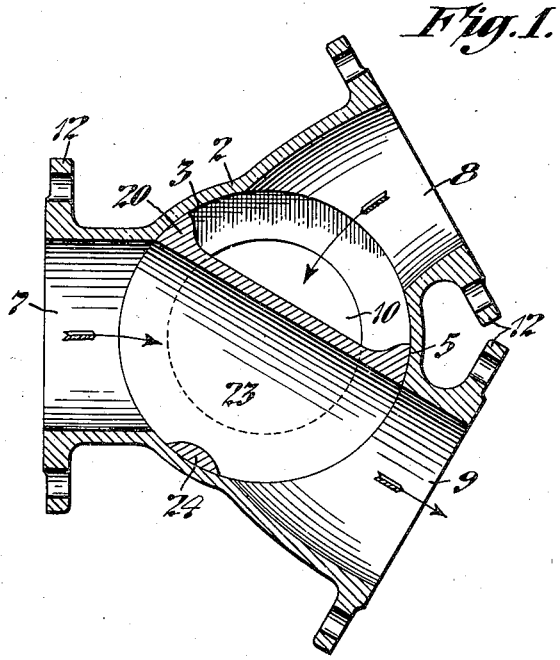
Fig. 4 is a transverse sectional view through the valve showing the cylindrical form of the septum of the valve-plug for dividing the interior of the casing into separate chambers to reverse the direction of the flow of fluid therethrough.

The valve-closure comprises a plug 20 of generally cylindrical contour to adapt it to rotate in the cylindrical bore 3 in the casing 2 and a stem 21 projecting from the plug axially thereof. The plug 20 is formed with a disk 22 adapted to fit the upper annular bearing 4 in the casing 2 and a skirt or septum 23 depending therefrom. As herein illustrated the septum 23 is formed as an integral part of the disk 22 and is continuously curved downwardly and outwardly with its outer edge terminating in an arc of a circle of the same radius as the cylindrical bore 3, see Figs. 2 and 4. Thus the septum 23 extends across the bore 3 of the casing 2 to divide it into separate chambers with its outer edge bearing against the bearing 5 on the inside wall of the casing. An integral strut or brace 24 extends between the outer or lower end of the septum 23 and the disk 22 and has its outer face rounded to correspond to the curvature of the cylindrical bore 3, see Fig. 4. The valve-stem 21 is of cylindrical form provided with longitudinally-spaced peripheral grooves 25 and 26 and a longitudinally-extending keyway 27 adjacent its outer end.

The valve-closure or plug 20 is mounted to rotate in bearings in a frame or bracket 30 comprising a closure-plate 31 for the casing 2 with ribbed arms 32 extending upwardly therefrom. The closure-plate 31 is removably mounted on the annular seat 6 of the casing 2 by means of the studs 13 projecting through holes spaced around its outer edge. The closure-plate 31 is clamped to the casing 2 by means of nuts 33 screwed down on the threaded studs 13 to close the open end of the cylindrical bore 3, a gasket 29 surrounding the seat 6 to provide a fluid-tight joint. Located centrally on the closure-plate 31 is an inboard bearing stem 34 having a central bore 35 through which the valve-stem 21 extends and a counterbore 36 at its outer end to provide an annular pocket for receiving a packing P. An outboard bearing 37 is supported at the outer ends of the arms 32 having a bore 38 in axial alinement with the bore 35 in the inboard bearing 34 to receive the valve-stem 21. The inner face of the outboard bearing 37 has a counterbore 39 to provide an annular flange 40 for a purpose as later explained.

A cap or hood 42 is mounted on the end of the valve-stem 21, being formed with a central bore 43 into which the end of the valve-stem 21 projects and a counterbore 44 surrounded by an annular flange 45. The hood 42 is secured rotatively with the valve-stem 21 by means of a key 46 engaging the keyway 27 in the valve-stem and a keyway 47 in the hood. The hood 42 is attached to the valve-stem 21 by means of a screw 48 which is inserted through a rectangular recess 49 at the outer end of the hood and screwed into a tapped hole in the end of the valve-stem to engage its head with a shoulder 50 in the hood. Depending from the hood 42 is an arcuate flange 51, the squared ends of the flange being adapted to engage an upwardly-projecting stop 52 on one of the arms 32 to limit the turning of the valve-closure 20 to one or the other of its two operative positions. The valve-closure 20 may be conveniently operated by a handle or lever 60 having a rectangular key 61 adapted to fit the rectangular recess 49 in the hood 42 and to be detachably connected thereto by a pin 62; or a handwheel may be similarly connected to the valve-stem 21 for this purpose.

In accordance with the present invention the valve-closure 20 is mounted on the frame 30 by means of removable thrust collars 63 and 64 on the valve-stem 21. Each of the thrust collars 63 and 64 is comprised of removable arcuate segments held in the peripheral grooves 25 and 26 by the flanges 40 and 45 on the bearing 37 and hood 42, respectively. As herein illustrated each of the thrust collars 63 and 64 comprises two semicircular segments but it will be understood that the collars may have any desired number of segments. The peripheral grooves 25 and 26 on the valve-stem 21 are so spaced that the thrust collars 63 and 64 abut the shoulders 65 and 66 at opposite sides of the outboard bearing 37 to hold the valve-stem and its integral plug 20 against axial movement relatively of the frame 30.

Figure 6:
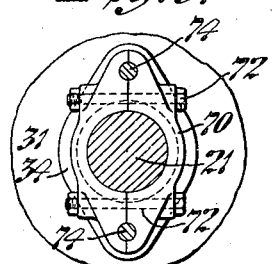
Fig. 6 is a transverse sectional view on line 6—6 of Fig. 2 showing the separable halves of the packing gland clamped together to form a unitary sleeve.
Figures 2, 3:
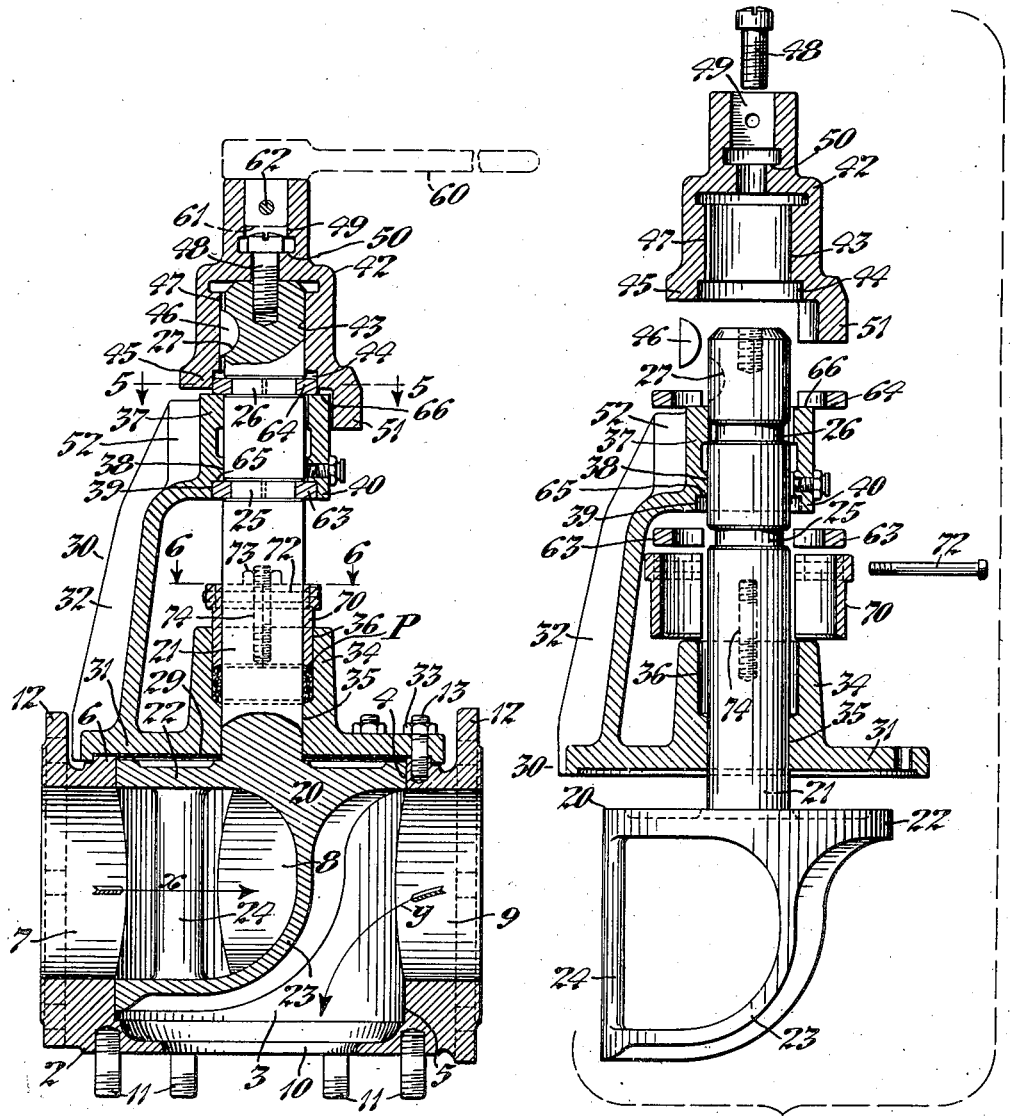
Fig. 2 is a sectional view of the valve on line 2—2 of Fig. 1 showing the valve-closure in operative position in the casing and the segmental thrust collars for mounting the closure on the detachable frame.
Fig. 3 is a sectional view through the valve-mechanism showing the parts in extended relationship to adapt the valve-closure to be assembled on or disassembled from the frame.

A packing gland or sleeve 70 is provided for slidable engagement with the pocket formed by the counterbore 39 in the bearing 34 to compress the packing P therein. As illustrated in Figs. 3 and 6 the gland comprises two separable halves which are drawn together to form a unitary sleeve by means of bolts 72 extending therethrough at opposite sides of the valve-stem 21. The gland 70 is forced into the counterbore 39 to compress the packing P therein by means of nuts 73 screwed onto threaded studs 74 projecting upwardly from the bearing 34 through the gland, see Figs. 2 and 6. One form of the invention having now been described in detail the method of assembling the parts and operating the valve-closure will be next explained.

The valve-closure 20 is first assembled on the frame 30 to form a self-contained unit by sliding the valve-stem 21 through the bores 35 and 38 of the inboard and outboard bearings 34 and 37 to the position illustrated in Fig. 3. The cooperating segments of the thrust collar 63 are inserted in the peripheral groove 25 in the valve-stem 21 and the latter is then slid axially to enter the thrust collar 63 into the counterbore 39 and engage it with the shoulder 65. The segments of the thrust collar 63 are then retained in the groove 25 in the valve-stem 21 by the annular flange 40 and the peripheral groove 26 is positioned at the opposite side of the outboard bearing 37. The segments of the thrust collar 64 may now be inserted in the groove 26 to bear against the annular shoulder 66 on the bearing. The hood 42 is then mounted on the end of the valve-stem 21 by sliding it axially thereof with the key 46 in position engaging the keyways 27 and 47. The hood is attached to the valve-stem 21 by inserting the screw 48 through the rectangular opening 49 in the hood and screwing it into the end of the valve-stem. As the hood 42 is moved axially of the valve-stem 21 toward the bearing 37 the separable segments of the thrust collar 64 are enclosed by its flange 45 to prevent their displacement. The valve-closure 20 is thus rotatably mounted on the frame 30 and held against axial movement by the engagement of the thrust collars 63 and 64 with the shoulders 65 and 66 at the opposite sides of the outboard bearing 37. The packing P may then be inserted in the pocket formed by the counterbore 36 in the bearing 34 and the separable halves of the gland 70 assembled by means of the bolts 72 to provide a unitary sleeve. The packing P is compressed by screwing down the nuts 73 on the threaded studs 74 to force the end of the gland into the counterbore 36. The handle or lever 60 is attached to the hood 42 by inserting its rectangular key 61 into the rectangular recess 49 and driving the pin 62 through alined holes therein.

Figure 5:
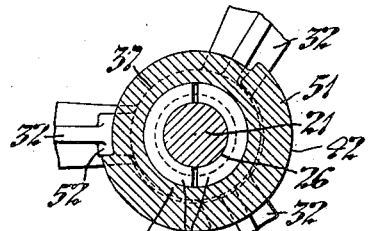
Fig. 5 is a transverse sectional view on line 5—5 of Fig. 2 showing one of the segmental thrust collars held in its peripheral groove in the valve-stem.

The self-contained valve mechanism unit is applied to the casing 2 by inserting the end of the valve-plug 20 in the cylindrical bore 3 and lowering the unit until the closure-plate 31 rests on the gasket 29 overlying the annular seat 6 of the casing. The closure-plate 31 is attached to the casing 2 by screwing the nuts 33 onto the threaded studs 13. The disk 22 of the valve-plug 20 is then alined with the annular bearing 4 while the lower edge of the septum 23 is alined with the lower annular bearing 5. By turning the handle or lever 60 the plug 20 may be rotated to one or the other of its two operative positions illustrated in Figs. 1 and 4 and the relationship of the plug with respect to the casing is determined by the engagement of the ends of the dependent flange 51 on the hood 42 with the stop 52 on one of the arms 32, as shown most clearly in Fig. 5. With the valve-plug 20 in the position illustrated in Fig. 1 the fluid enters through the port 7 as indicated by the arrow $x$ and is directed outwardly through the port 8 to a dyeing kier or other vessel, not herein shown. The fluid may be exhausted from the dyeing kier or the like by way of the port 9 to flow downwardly and outwardly through the axial port 10 as indicated by the arrow y in Fig. 2. When the valve-plug 20 is turned to the position illustrated in Fig. 4 the fluid is directed from the inlet port 7 outwardly through the port 9 and may be returned through the port 8 and exhausted downwardly through the port 10.

Due to the engagement of the thrust collars 63 and 64 with the shoulders 65 and 66 at the opposite sides of the outboard bearing 37 the valve-plug 20 is prevented from axial movement in the casing thereby holding it firmly in place. Moreover, the two spaced bearings 34 and 37 for the valve-stem 21 prevent lateral play so that wear between the plug 20 and its bearing in the bore of the casing 2 is minimized. When repair or replacement of the parts is necessary the valve-mechanism may be removed from the casing 3 as a unit by merely unscrewing the nuts 33 on the threaded studs 13. To remove the valve-closure or plug 20 from the frame 30 the pin 62 is withdrawn, the handle 60 lifted from the hood 42, the screw 48 removed, and the hood slid axially to remove it from the end of the valve-stem 21. The segments of the thrust collar 64 will then be exposed and may be withdrawn radially from the groove 26 in the valve-stem 21 to permit the latter to be slid to the position shown in Fig. 3. In this position the segments of the thrust collar 63 may be withdrawn radially from the groove 25 and the separable halves of the gland 70 separated as illustrated. The valve-stem 21 may then be withdrawn axially through the bearings 37 and 34 to remove the valve-closure. The parts may be reassembled conveniently in the manner as previously explained without fitting or adjustment, the fixed location of the grooves 25 and 26 for the thrust collars 63 and 64 insuring against misalinement or maladjustment of the plug 20.

It will be observed from the foregoing that the present invention provides a novel construction and arrangement of elements in a valve to facilitate the assembly and disassembly of its parts. It will further be observed that the invention provides segmental thrust collars which are easily and quickly inserted and removed from peripheral grooves in the valve-stem to detachably mount the valve-closure on its frame while providing for accurate positioning of the valve-closure in the casing. It will also be observed that the invention provides a simple and compact construction and arrangement of elements to adapt the valve for economical manufacture and insure against wear on the bearing between the valve-closure and the casing.

While the present invention is herein described and illustrated as embodied in a preferred form of construction, it is to be understood that various modifications may be made in the structure and arrangement of the parts of the valve without departing from the spirit or the scope of the invention. Therefore, without limiting myself in this respect, I claim:

1. A device comprising a casing open at one end, and mechanism mounted on the casing for removal therefrom as a unit, said mechanism comprising a frame having a cover for closing the open end of the casing and arms projecting upwardly therefrom, spaced bearings on the frame, a stem extending through the inner and outer bearings on the frame, said stem having peripheral grooves at the opposite sides of the outer bearing, removable segments in the grooves cooperating to form thrust collars engaging the opposite sides of the outer bearing to restrain the stem against axial movement, and a two-part gland embracing the stem and cooperating with the inner bearing to compress a packing therein.

2. A device comprising a casing open at one end, and mechanism mounted on the casing for removal therefrom as a unit, said mechanism comprising a frame having a cover for closing the open end of the casing and arms projecting upwardly therefrom, an inner bearing in the cover and an outer bearing on the upper end of the arms, a stem extending through the bearings in the cover and on the frame, and two-part removable thrust collars cooperating with the stem and one of the bearings for holding the stem against axial displacement, said stem being slidable through the frame to detach the stem therefrom when the thrust collars are removed.

3. A device comprising a casing open at one end, and mechanism mounted on the casing for removal therefrom as a unit, said mechanism comprising a frame secured to the open end of the casing and having a bearing, a stem extending through the bearing on the frame, said stem having peripheral grooves spaced longitudinally thereof a distance equal to the length of the bearing, and removable segments in the grooves cooperating to form thrust collars engaging the opposite ends of the bearing to restrain the stem against axial movement in either direction.

4. A device comprising a casing open at one end, and mechanism mounted on the casing for removal therefrom as a unit, said mechanism comprising a frame for closing the open end of the casing, said frame having a bearing with an annular recess at one end thereof, a stem extending through the bearing on the frame, said stem having peripheral grooves spaced longitudinally thereof a distance equal to the length of the bearing, removable segments positioned in one of the grooves in the stem and enclosed within the annular recess in the bearing to retain them in position in the groove, removable segments in the other groove in the stem, and a hood on the stem overlying the last mentioned segments to retain them in position in the groove in the stem, said removable segments constituting thrust collars engageable with the opposite ends of the bearing for holding the stem against axial movement in either direction.

JOHN M. WOOD.